US009296481B2

(12) United States Patent
Thompson et al.

(10) Patent No.: US 9,296,481 B2
(45) Date of Patent: Mar. 29, 2016

(54) VEHICLE SEAT WITH LOCKING APPARATUS (71) Applicant: Thomson Aero Seating Limited, Craigavon (GB)

(72) Inventors: James Thompson, Down (GB); Seamus Mulholland, Armagh (GB)

(73) Assignee: Thompson Aero Seating Limited (GB)

( * ) Notice: Subject to any disclaimer, the term of this patent is extended or adjusted under 35 U.S.C. 154(b) by 0 days.

(21) Appl. No.: 14/675,991

(22) Filed: Apr. 1, 2015

(65) Prior Publication Data

US 2015/0203205 A1 Jul. 23, 2015

Related U.S. Application Data (63) Continuation-in-part of application No. 13/978,014, filed as application No. PCT/EP2012/050534 on Jan. 14, 2012.

(30) Foreign Application Priority Data

Jan. 14, 2011 (GB) .................................. 1100604.6
Apr. 3, 2014 (GB) .................................. 1406009.9

(51) Int. Cl.
B64D 11/06 (2006.01)
B60N 2/06 (2006.01)
B60N 2/42 (2006.01)

(52) U.S. Cl.
CPC .............. *B64D 11/064* (2014.12); *B60N 2/067* (2013.01); *B60N 2/43* (2013.01); *B64D 11/0619* (2014.12)

(58) Field of Classification Search
CPC ............ B60N 2/43; B60N 2/06; B60N 2/067; B60N 11/06; B60N 11/064; B60N 11/0619; B60D 11/06; B60D 11/064; B60D 11/0619
USPC .................................... 297/216.1, 344.1, 374
See application file for complete search history.

(56) References Cited

U.S. PATENT DOCUMENTS

| 6,070,938 | A | 6/2000 | Elio |
| 6,312,052 | B1 | 11/2001 | Elio |
| 7,748,778 | B1 | 7/2010 | Udriste et al. |

FOREIGN PATENT DOCUMENTS

| DE | 37 07 750 A1 | 9/1988 |
| DE | 100 26 978 C1 | 10/2001 |

(Continued)

OTHER PUBLICATIONS

International Search Report issued in corresponding International Application No. PCT/EP2012/050534, mailed Jun. 1, 2012.

(Continued)

*Primary Examiner* — Anthony D Barfield
(74) *Attorney, Agent, or Firm* — RatnerPrestia (57) ABSTRACT A vehicle seat includes a carriage that is movable with respect to a base, and a locking apparatus having first and second components, each having teeth that inter-engage such that, during movement of the carriage relative to the base, one of the first and second components imparts movement to the other, the locking apparatus further including a locking member having teeth for selectively inter-engaging the first and second components, the locking member being movable between a non-locking state, where the locking member teeth do not engage the teeth of the first and second components, an intermediate state, where the locking member teeth engage the teeth of the first component, and a locking state, where the locking member teeth engage the teeth of both of the first and second components, the locking member being moved between its intermediate and locking states by moving the first component relative to the second component.

25 Claims, 3 Drawing Sheets

(56) References Cited

FOREIGN PATENT DOCUMENTS

| | | |
|---|---|---|
| DE | 10 2009 059126 A1 | 7/2010 |
| WO | WO 2012/095534 A1 | 7/2012 |

OTHER PUBLICATIONS

Written Opinion issued in corresponding International Application No. PCT/EP2012/050534, mailed Jun. 1, 2012.

Non-Final Office Action mailed Aug. 25, 2015 for U.S. Appl. No. 13/978,014.

European Search Report mailed Aug. 17, 2015 in European Application No. 15162108.3.

GB Search Report issued in related GB Application No. 1406009.9, dated Sep. 12, 2014.

Notice of Allowance mailed Feb. 12, 2016 for U.S. Appl. No. 13/978,014.

VEHICLE SEAT WITH LOCKING APPARATUS

RELATED APPLICATIONS

This application is a continuation-in-part of U.S. application Ser. No. 13/978,014, filed Oct. 10, 2013, which is the United States National Phase of International Application No. PCT/EP2012/050534, filed Jan. 14, 2012, which claims the benefit of priority of United Kingdom Application No. 1100604.6, filed Jan. 14, 2011. This application also claims the benefit of priority of United Kingdom Application No. 1406009.9, filed Apr. 3, 2014. The contents of all of the foregoing applications recited in this paragraph are incorporated by reference herein in their entireties.

FIELD

The present invention relates to vehicle seats, especially aircraft seats.

BACKGROUND

Vehicle seats often include a mechanism that allows them to move back and forth, for example to adjust leg room or to facilitate reclining the seat. In the event of sudden acceleration or deceleration of the vehicle, the forces acting on the seat, with or without a passenger, can cause unwanted and dangerous movement of the seat via the mechanism.

In a typical reclinable aircraft seat, the recline mechanism, which enables the movement of the seat between upright and recline position, optionally bed position, comprises a movable upper carriage coupled to a fixed lower structure that is connected to the aircraft floor structure. At any position within its full range of movement, the upper carriage may be stopped by the passenger, and must be securely retained against inadvertent movement. In the case of a manually operated recline mechanism, this may be achieved by means of a system of spring-loaded teeth and slots similar to a manual car seat adjuster. If the recline mechanism is to be operated using a motor and reduction gear system, the force required to back drive the unpowered motor is normally sufficient to prevent movement of the carriage. Except for TTL (taxi, take-off or landing), the loads that might cause the carriage to move are in the order of 1.5G-2G in a forward or aft direction. For TTL, the loads that must be sustained are 9G (static) or 16G (dynamic) in the forward direction and 1.5G in the aft direction.

Vehicle seats may also comprise an apparatus for locking the vehicle seat, and for locking the seat's movable recline carriage, to prevent the unwanted and dangerous movement of the seat, such as in the event of sudden acceleration or deceleration of the vehicle. However, such apparatuses can be prone to inappropriate locking or jamming during the normal use of the seat, for example, due to foreign objects getting lodged in the recline mechanism. Consequently, the further normal use of the seat is prevented.

It is desirable therefore to provide an apparatus for locking a vehicle seat with respect to its slide mechanism, and in particular for locking a seat's movable recline carriage with respect to a fixed lower structure, which mitigates the problems outlined above.

SUMMARY

Accordingly, a vehicle seat is provided which has a carriage that is linearly movable with respect to a base, and a locking apparatus comprising first and second components, each having a respective set of teeth that inter-engage such that, during movement of the carriage with respect to the base, one of said first and second toothed components imparts movement to the other via the respective teeth, the locking apparatus further comprising a locking member having a set of teeth formed thereon for selectively inter-engaging the teeth of the first and second components, the locking member being movable between a non-locking state, wherein the teeth of the locking member do not engage the teeth of either of said first and second components, an intermediate state, wherein the teeth of the locking member engage the teeth of the first component, and a locking state, wherein the teeth of the locking member engage with the teeth of both of said first and second components to prevent relative movement between the first and second components, the locking member being moved between its intermediate and locking states by virtue of movement of the first component with respect to the second component.

Preferably said carriage is linearly movable with respect to said base along a first axis corresponding to a fore-and-aft direction of a seated passenger, said locking member being responsive to a force in a first direction along said first axis above a threshold level to move from its non-locking state into its intermediate state, subsequent displacement of said carriage with respect to the base due to said force causing movement of the locking member from its intermediate state to its locking state. The force may be created in use by deceleration of said vehicle seat and/or the force may be created in use by acceleration of said vehicle seat.

Preferably the locking apparatus is configured such that said locking member adopts its non-locking state under the influence of gravity.

The locking member may be pivotably movable between its non-locking and intermediate states.

The first component may comprise a rotatable gear, or a toothed rack or other toothed component and/or the second component may comprise a rotatable driven gear. Alternatively, the first component may comprise a rotatable driven gear, and/or the second component may comprise a rotatable gear, or a toothed rack or other toothed component.

In typical embodiments, the vehicle seat is an aircraft seat.

One of said first and second toothed components may be provided on the carriage, the other on the base. Alternatively, both first and second toothed components may be provided on the base.

Said locking member may be a partially toothed gear or a segment of a gear. Optionally, said locking member is a partially toothed gear having a plurality of teeth around one or more portions of the circumferential edge of the locking member, wherein, in the locking state, said teeth are positioned and orientated to be selectively engageable with the teeth of the first and second components.

In typical embodiments, said carriage and said base are coupled together by a rack and pinion gear. Said rack may serve as said first toothed component, while said pinion gear may serve as said second toothed component. Alternatively, said rack and/or pinion gear may serve as said first toothed component, and said second toothed component may comprise a further first gear inter-engageable with both said pinion gear and said locking member.

The rack may be provided on said carriage and the corresponding pinion gear may be provided on said base, in which case the pinion gear is rotatable about an axis that is fixed with respect to the base. Alternatively, the rack may be provided on said base and the corresponding pinion gear may be provided on said carriage, in which case the pinion gear is rotatable about an axis that is fixed with respect to the carriage.

In preferred embodiments, the locking member of the locking apparatus is engageable with the pinion gear when the locking member is in its intermediate position, such that the locking member and pinion gear rotate, in use, in opposite senses, causing the locking member to be moved between its intermediate state, in which said locking member is disengaged from the pinion gear the first gear, and its locking state, in which said locking member inter-engages with both the pinion gear and the first gear, to prevent rotation of the pinion and first gears. In embodiments where the rack is provided on the carriage, said first gear is rotatable about an axis that is fixed with respect to the base, and in embodiments where the rack is provided on the base, said first gear is rotatable about an axis that is fixed with respect to the carriage The locking apparatus is particularly intended for stopping relative movement of the carriage and base in the event of deceleration of the vehicle (such as in its forward direction of movement) at a level above a threshold value. Hence, said locking member is movable to its intermediate state from its non-locking state in response to force being exerted on said locking apparatus in a forward direction. More particularly, said locking member is movable to its intermediate state in response to force above a threshold level being exerted on said locking apparatus in said forward direction. Said forward direction corresponds with the forward direction of movement of the vehicle when said seat faces in said forward direction and so said forward force may be caused by deceleration of the vehicle.

In the preferred embodiment, said first gear inter-engages with said pinion gear. Further preferably, said locking member inter-engages with said pinion gear when in its intermediate state and with both the pinion gear and the first gear when in its locking state. Alternatively said first gear may also serve as said pinion gear, in which case said locking member is movable to engage with said rack, and the first gear in its locking state.

Preferably, the locking apparatus further comprises a supporting arm, the locking member being rotatably coupled to the supporting arm, for movement between its intermediate and locking states, and the supporting arm being pivotable to allow the locking member to pivot between its non-locking and intermediate states. In the preferred embodiment, the supporting arm is pivotable about the rotational axis of the first gear.

The locking apparatus preferably is arranged to adopt its non-locking state under the influence of gravity. This may be achieved by positioning the locking member and the pivot axis of said locking member below the pinion gear. In preferred embodiments, the supporting arm has a counterweight portion and the supporting arm is configured to have a centre of gravity positioned such that the mass of the counterweight portion tends to cause a moment under gravity about the pivot axis of the supporting arm that has an opposite sense to the moment caused by the mass of the locking member under gravity The first gear is preferably located below and aft of the pinion gear. The locking member is preferably located below and forwardly of the first gear.

In preferred embodiments, either the first gear or the pinion gear is directly or indirectly coupled to the output shaft of a rotary actuator. In embodiments of the invention, the supporting arm is arranged about the output shaft of a rotary actuator and is pivotable about the rotational axis of said output shaft. Preferably, the supporting arm is arranged about the output shaft of the rotary actuator by means of a bearing. Further preferably, the bearing is supported by a rotary actuator assembly, optionally by a bracket coupled to the rotary actuator assembly.

Preferably, the locking apparatus comprises a resilient biasing device to maintain the locking member in an orientation in which the teeth of said locking member are engageable with the teeth of the pinion gear when the locking member is moved to its intermediate state. Further preferably, the resilient biasing device maintains the locking member in an orientation in which the teeth of said locking member are not engageable with the teeth of the first gear when the locking member is in the intermediate state. Said resilient biasing device preferably comprises a spring loaded detent and, optionally, a back stop to restrict the rotation of the locking member caused by the rotational force imparted on the locking member by the spring loaded detent. The rotation of the locking member caused by the rotational force imparted on the locking member by the spring loaded detent may be restricted to about one tooth pitch by the back stop. In embodiments of the invention, the biasing force of said resilient biasing device can be overcome in the event of said threshold force and/or said rotational force exerted on the locking member by the pinion gear.

In typical embodiments, the seat is reclinable, said relative linear movement of the carriage and base corresponding to the seat being operated between reclined and non-reclined states. Alternatively, or in addition, the seat is movable forward and rearwards, said relative linear movement of the carriage and base corresponding to the seat being moved forward and rearward.

Further advantageous aspects of the invention will become apparent to those ordinarily skilled in the art upon review of the following description of a specific embodiment and with reference to the accompanying drawings.

BRIEF DESCRIPTION OF THE DRAWINGS

The present invention will now be described, by way of example, with reference to the accompanying drawings, in which.

DETAILED DESCRIPTION

Figure 1:
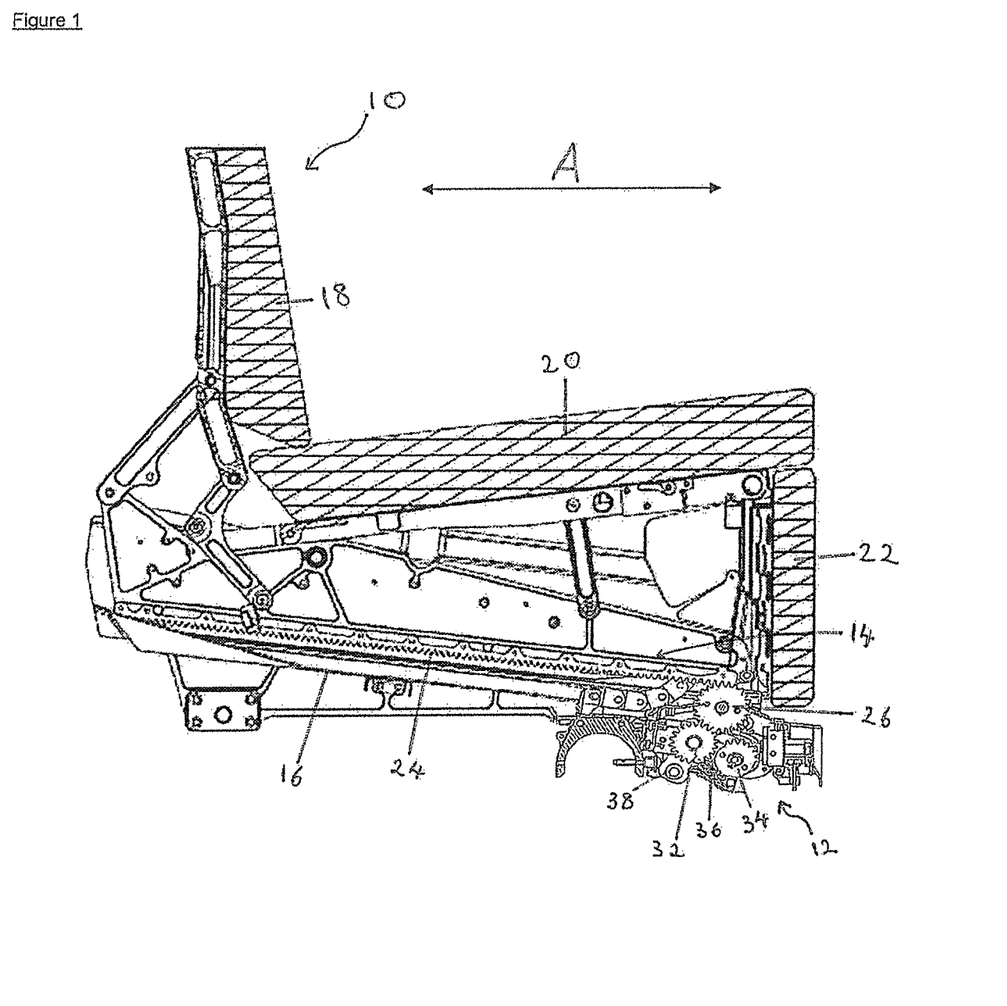
FIG. 1 is a sectioned side view of a reclinable seat including a locking apparatus embodying the invention.

Referring to FIG. 1, there is shown, generally indicated as 10, a vehicle seat including a locking apparatus 12 embodying the invention. The seat 10 is reclinable between a non-reclined state and a reclined state. The invention is particularly suitable for use with aircraft seats and so the illustrated seat 10 is an aircraft seat. Typically, in the reclined state, the seat 10 may serve as a bed and, to this end, may provide a substantially horizontal sleeping surface. The seat 10 may adopt a plurality of semi-reclined states between the non-reclined state and the (fully) reclined state.

The vehicle seat 10 of the invention includes a carriage 14 that is movable with respect to a base 16. The base 16 is fixed to the floor of the aircraft (or other vehicle) by any suitable fixing device, e.g. bolts. The seat 10 typically comprises a seat back 18, a seat pan 20 and a leg rest 22 which are all carried by the carriage 14. The carriage 14 is movable substantially linearly, forwards and rearwards, with respect to the base 16, as indicated by arrow A in FIG. 1. Normally, this linear movement is substantially in the fore-and-aft direction of the vehicle, which in turn normally corresponds to the direction in which a seated passenger faces. A mechanism for facilitating relative movement between the carriage 14 and the base 16 is provided and preferably comprises a rack 24 and pinion, or gear 26, assembly. In the illustrated embodiment, the pinion gear 26 is provided on, and its rotational axis is fixed with respect to, the base 16, and the rack 24 is provided on the carriage 14. However, in alternative embodiments, the pinion gear 26 may provided on the carriage 14 and the rack 24 may be provided on the base 16. In either case, relative movement can be imparted between the carriage 14 and base 16 by inter-engagement of the respective teeth of the rack 24 and pinion gear 26. Also in either arrangement, it is preferred to locate the pinion gear 26 below the rack 24 (as illustrated), although it is possible to locate the pinion gear 26 above the rack 24. Preferably, the pinion gear 26 is located at the foremost end of the base 16, and therefore adjacent the foremost end of the carriage 14 when the seat 10 adopts its TTL (taxi, take-off or landing) position. Typically, movement of the carriage 14 relative to the base 16 is powered in which case the pinion gear 26 is coupled (directly or indirectly) to the drive shaft of an actuator, preferably a rotary actuator, e.g. a motor (not shown), such that rotation of the drive shaft causes rotation of the pinion gear 26 which in turn causes linear movement of the carriage 14 via the rack 24.

In alternative embodiments, the seat 10 need not necessarily be reclinable, in which case the carriage, base, rack, gear and, if required motor, may all be configured to facilitate fore-and-aft movement of the seat 10.

In normal, e.g. non-crash, situations, the resistive torque of the rotary actuator is sufficient to maintain the relative position of the carriage 14 and base 16. However, depending on the mass of the carriage 14 (or the combined mass of the carriage 14 and a passenger) it is possible, especially in the event of a crash, that the inertia of the carriage 14 might overcome the resistive torque of the rotary actuator. Should this occur the carriage 14 would not be prevented from moving and the seat 10 could be deemed to fail safety requirements.

The locking apparatus 12 is provided to selectively lock the position of the carriage 14 with respect to the base 16. As is described in more detail below, the locking apparatus 12 is configured to move from a non-locking state to an intermediate state and subsequently to a locking state in response to being subjected to a force that exceeds a threshold value. More particularly, the locking apparatus 12 is configured such that its inertia maintains it in the non-locking state, or at least out of the intermediate state, until a threshold-exceeding force is experienced whereupon the locking apparatus 12 is caused to adopt the intermediate state. The locking apparatus 12 may therefore be described as an inertia locking apparatus. In typical embodiments, the force required to cause the locking apparatus 12 to adopt the intermediate state and subsequently locking state is created by deceleration of the vehicle exceeding a threshold value. In the typical case where the seat 10 is facing forward in the direction of travel, i.e. in a forward longitudinal direction, the required deceleration is longitudinal and in the direction of travel. Hence, the locking apparatus 12 removes sensitivity to the carriage mass. More generally, the inertia of the locking apparatus 12 is such that it is responsive to forces of acceleration (where deceleration is negative acceleration), in particular linear acceleration, to maintain a non-locking state until a threshold level of acceleration is experienced whereupon it moves into the intermediate state, and wherein the activating forces are caused by acceleration or deceleration of the seat 10, and more particularly, of the vehicle.

The locking apparatus 12 comprises a first gear 32 rotatable about an axis that may be fixed with respect to the base 16. In the preferred embodiment, the first gear 32 is connected (directly or indirectly) to the output shaft of the rotary actuator and so is driven, typically directly driven, by the rotary actuator, although one or more other intermediate gears may alternatively be provided. The rotational axis of the first gear 32 corresponds with the rotational axis of the output shaft of the rotary actuator, although it may alternatively be parallel with the rotational axis of the actuator when one or more intermediate gears are provided. The first gear 32 is intermeshed with the pinion gear 26 such that rotation of the first gear 32 causes rotation of the pinion gear 26 but in the opposite sense. As used herein, the term "intermesh" is synonymous with "inter-engage" and refers to the reversible meshing of the teeth of respective gears.

The locking apparatus 12 further comprises a locking member 34 rotatable about an axis that is parallel with the rotational axis of the pinion gear 26, first gear 32 for rotation between intermediate and locking states, as will be described below in more detail. The respective rotational axes of the gears 26, 32, 34 are parallel with one another and run substantially perpendicularly to the direction A, and usually perpendicular to the direction of movement of the vehicle. The locking member 34, in the present embodiment, is a partially toothed gear or gear segment, that is, the locking member 34 may have one or more teeth located around part of the circumferential edge of the locking member 34. The locking member 34 may have a plurality of teeth around one or more portions of the circumferential edge of the locking member 34, wherein at least some of the teeth are positioned and orientated to be engageable with the teeth of the pinion gear 26. In preferred embodiments, the teeth of the locking member 34 are contiguously located around one portion of the circumferential edge of the locking member 34, said portion consisting of about 25% to about 75% of the circumference of the locking member 34. In the non-locking state, the locking member 34 is not in contact with, i.e. does not intermesh with, the pinion gear 26 and the first gear 32. Therefore, in the non-locking state, the locking member 34 cannot interfere with the normal operation (rotation) of the pinion gear 26 and the first gear 32 and the normal forward/aft and reclining movement of the seat 10.

In certain embodiments, the pinion gear 26 may be driven directly (or indirectly via one or more intermediate gears) by the rotary actuator, in which case rotation is imparted to the first gear 32 by the pinion gear 26. In either case, the positions of the respective rotational axis of the pinion gear 26 and the first gear 32 are static with respect to the base 16. The position of the locking member 34, and therefore its rotational axis, is variable and may be maintained by a supporting arm 36, which is free to rotate or pivot about the rotational axis of the first gear 32 such that the locking member 34 is moveable between its non-locking and intermediate states.

The locking member 34 may be coupled to the first gear 32 by the supporting arm 36. The supporting arm 36 is configured to allow the locking member 34 to pivot about the rotational axis of the first gear 32. To this end, the supporting arm 36 is pivotable about the rotational axis of the first gear 32, to allow movement of the locking member between its non-locking and intermediate states, and the locking member 34 may be rotatably coupled to the supporting arm 36, to allow movement of the locking member 34 between its intermediate and locking states. As is described in more detail below, the locking member 34 may be pivotable about the rotational axis of the first gear 32 at least in response to being subjected to forces caused by deceleration of the vehicle. The locking member 34 is pivotable between a non-locking state (FIGS. 2-3) and an intermediate state (FIG. 4) in which the locking member 34 intermeshes with the pinion gear 26. The locking member 34 is subsequently rotatable between its intermediate state (FIG. 4) and its locking state (FIG. 5) during rotation of the pinion gear 26. The locking state of the locking member 34 corresponds to the locking state of the locking apparatus 12.

The supporting arm 36 may, for example, comprise a single plate or bracket located on one side of the gears 32, 34, or may comprise two spaced apart plates or brackets, one located on either side of the gears 32, 34, or may comprise any other suitable component or assembly of components. In the embodiment of the invention, the supporting arm 36 may be arranged about the output shaft of a rotary actuator and is pivotable about the rotational axis of said output shaft which corresponds to the rotational axis of the first gear 32. Further, the supporting arm 36 may be arranged about the output shaft of the rotary actuator by means of a bearing. The bearing may be supported by the rotary actuator assembly, for example by a bracket coupled to the rotary actuator assembly, and thus the actuator output shaft is free to rotate with substantially no contact between the supporting arm 36 and the output shaft.

Advantageously, the supporting arm 36 has a counterweight portion 38, and the supporting arm 36 is configured to have a centre of gravity positioned such that the mass of the counterweight portion 38 tends to cause a moment under gravity about the pivot axis of the supporting arm 36 that has an opposite sense to the moment caused by the mass of the locking member 34 under gravity. The weight of the supporting arm 36 may therefore be said to counterbalance the weight of the locking member 34 about the rotational axis of the first gear 32. This facilitates maintaining the locking member 34 in a preferred position when in the non-locking state and also helps move the locking member 34 to its intermediate state, into engagement with the pinion gear 26, in the event of deceleration as is described in more detail below. The supporting arm 36 has a counterweight portion 38 extending in a generally opposite direction with respect to the first gear 32 axis relative to the portion of the supporting arm 36 that carries the locking member 34 and, as such, extends rearwardly from the rotational axis of the first gear 32 in the illustrated embodiment.

In the preferred embodiment, the first gear 32 is located below and rearwardly (that is, aft) of the pinion gear 26. In this embodiment, the rearward direction corresponds with the direction in which the carriage 14 moves when the seat 10 is moved from its reclined or a semi-reclined state towards the non-reclined state, the forward direction being the direction in which the carriage 14 moves when the seat 10 is moved from its non-reclined state to the reclined state or a semi-reclined state. The forward direction corresponds with the direction of forward movement of the vehicle and so it is assumed in this example that the seat 10 faces in said forward direction. Preferably, the locking member 34 is located below and forwardly of the first gear 32. Conveniently, this is facilitated by the action of the counterweight portion 38. The supporting arm 36 is preferably also substantially below the axis of the first gear 32. In alternative embodiments, the first gear 32 may be located above and rearwardly of the pinion gear 26, the locking member 34 preferably being located above and forwardly of the first gear 32.

The locking apparatus 12 may comprise a resilient biasing device (not shown) to maintain the locking member 34 in an orientation in which the teeth of the locking member 34 are engageable with the teeth of the pinion gear 26 when the locking member 34 is moved to its intermediate state. Advantageously, the resilient biasing device may also maintain the locking member 34 in an orientation in which the teeth of said locking member 34 are not engageable with the teeth of the first gear 32 when the locking member 34 is in its intermediate state. The resilient biasing device typically comprises a spring loaded detent and a back stop. If sufficient torque is applied to the locking member 34 by the threshold force and/or the rotational force exerted on the locking member 34 by the pinion gear 26, the detent is overcome and the locking member 34 will rotate between its intermediate state and its locking state. The back stop can restrict the rotation of the locking member 34 caused by the rotational force imparted on the locking member 34 by the spring loaded detent. Typically, the rotation is restricted by the back stop to approximately one tooth pitch. This is to ensure that the teeth of the locking member 34 are always presented in a position where meshing with the pinion gear 26 is possible. The rotation of the locking member 34 in the opposite direction, that is, the direction of the rotation imparted by the pinion gear 26, is less restricted so that the locking member 34 can be rotated sufficiently to allow the teeth of the locking member 34 to intermesh with the teeth of the pinion gear 26 and the first gear 32 and the locking member 34 rotates from its intermediate state to its locking state. The locking member 34 may return to its unlocked state under the influence of gravity when the crash load levels decrease to less than the threshold value.

Figure 2:
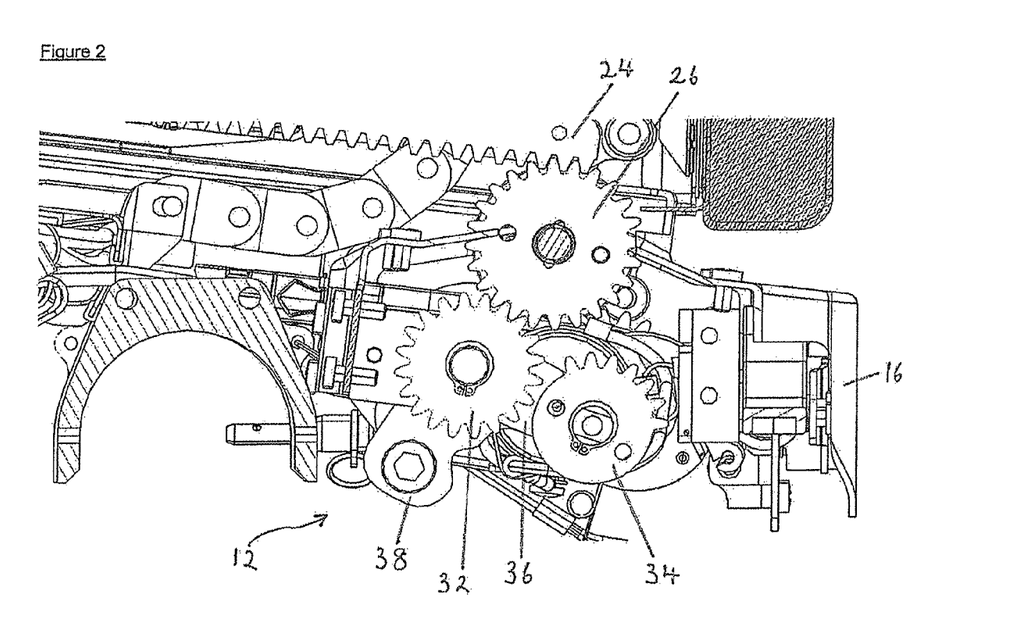
FIG. 2 is a sectioned side view of the locking apparatus of FIG. 1 in a non-locking state.
Figure 3:
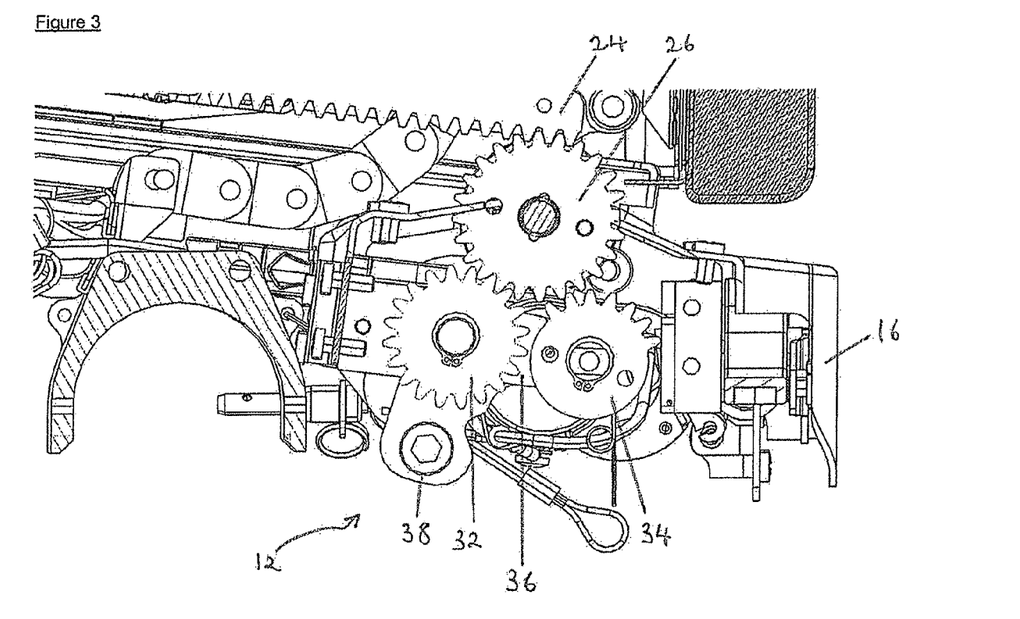
FIG. 3 is a sectioned side view of the locking apparatus of FIG. 1 in a non-locking state.

Referring in particular to FIGS. 2-3, the locking apparatus 12 is shown in its non-locking state in which the locking member 34 is not engaged with either of the pinion gear 26 or the first gear 32. The locking apparatus 12 is configured to adopt the non-locking state under the influence of gravity, and when subjected to forces resulting from acceleration or deceleration of the vehicle during normal use, e.g. during take off, taxiing, landing or normal flight of an aircraft. In these circumstances, the locking member 34 is held in position by the weight of the locking member 34 (counterbalanced by the weight of the supporting arm 36, including any counterweight portion 38, in the preferred embodiment) acting forwardly of the rotational/pivotal axis of the supporting arm 36. The exact position of the locking member 34 in the non-locking state may vary depending on the activity of the vehicle.

When the vehicle seat 10, and therefore the locking apparatus 12, is subjected to a threshold-exceeding force in the forward direction, especially a force caused by deceleration of the vehicle exceeding a threshold value (as may occur during an accident or emergency situation), the combined mass of the locking member 34 and the supporting arm 36 (and any counterweight portion 38) generate a torque, or moment, about the rotational axis of the supporting arm 36 that counteracts and overcomes the weight, or inertia, of the locking member 34, causing the locking member 34 to move towards its intermediate state, wherein it can engage with the pinion gear 26 and, more particularly, intermeshes with the pinion gear 26 provided the respective teeth of the gears 34, 26 are positioned relative to one another to allow intermeshing. One purpose of the counterweight portion 38 is to prevent reduction in the turning moment as the height of the locking member 34 approaches that of the axis of the first gear 32. When the locking member 34 is intermeshed with the pinion gear 26, the pinion gear 26 may be prevented from rotating further. The arrangement is such that the deceleration required to move the locking member 34 is much less than that required to overcome the resistance of the rotary actuator and cause the gears 26, 32 to rotate due to movement of the carriage 14. Hence, the intermediate state is adopted before the carriage 14 can move. This may, for example, be arranged by appropriate selection of the combined mass of the locking member 34 and supporting arm 36 and, advantageously, the shape and configuration of the supporting arm 36.

Figure 4:
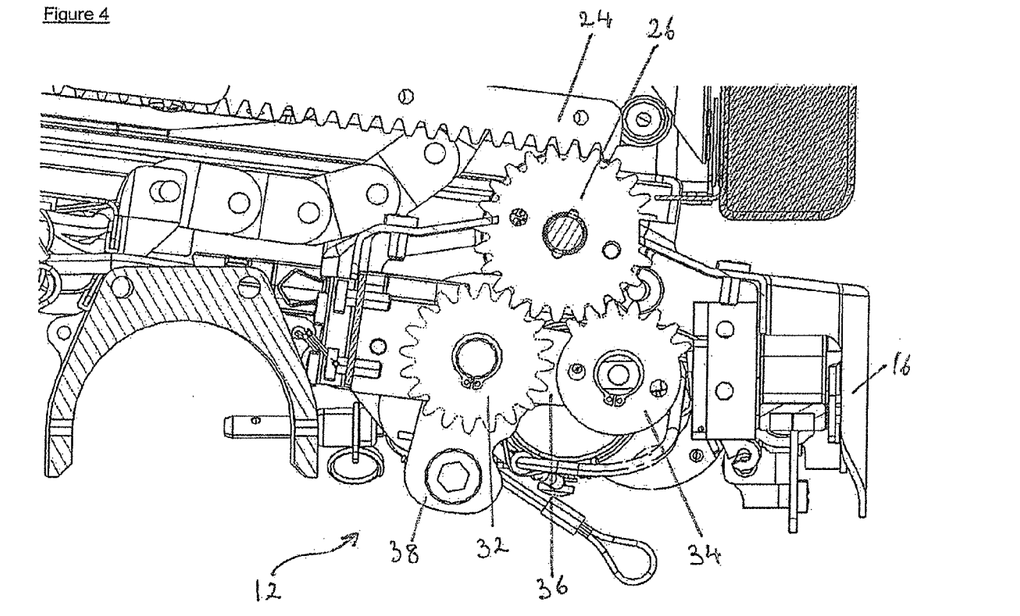
FIG. 4 is a sectioned side view of the locking apparatus of FIG. 1 in an intermediate state.
Figure 5:
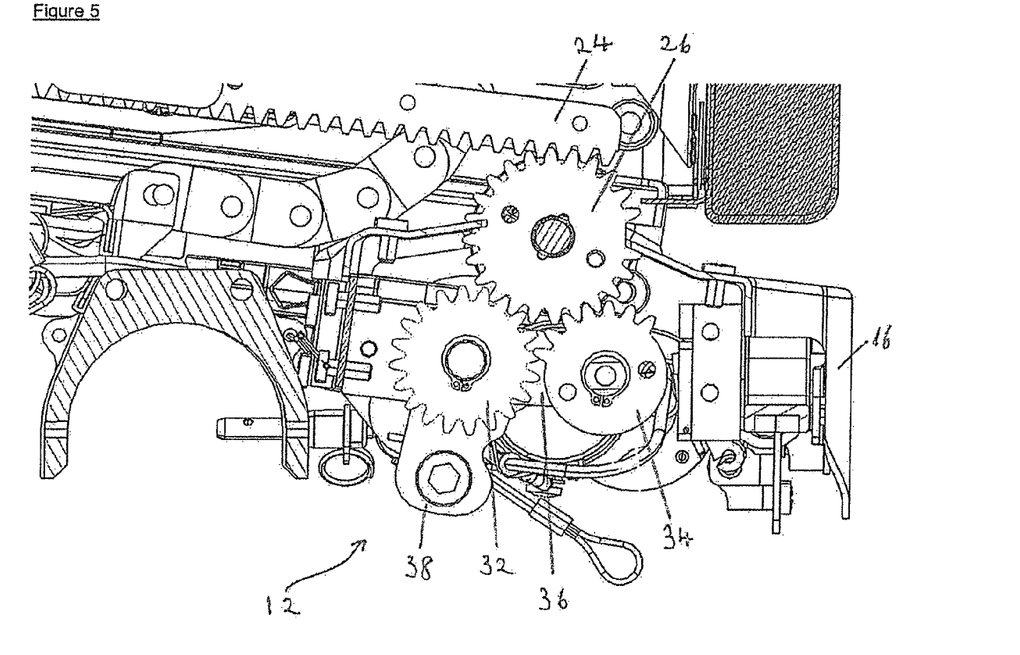
FIG. 5 is a sectioned side view of the locking apparatus of FIG. 1 in a locking state.

FIGS. 2-3 show the locking apparatus 12 in its non-locking state in which the locking member 34 is disengaged from the pinion gear 26, and also from the first gear 32. The exact position of the locking member 34 in the non-locking state is variable and depends on the equilibrium position adopted by the supporting arm 36 and the locking member 34 when acted on by gravity alone together with the effects of any forces that may be present due to acceleration or deceleration of the vehicle. In FIG. 2, zero acceleration of the vehicle is assumed in which case the locking member 34 adopts its equilibrium position under the influence of gravity alone. FIGS. 3 to 4 show, progressively, the locking member 34 moving towards and into engagement with the pinion gear 26 in response to deceleration of the vehicle. FIG. 5 shows the locking member 34 inter-engaging with the gears 26 and 32 in response to deceleration of the vehicle and the forward movement of the rack 24, and consequent rotation of the pinion gear 26.

In FIG. 3, the teeth of the locking member 34 can still rotate past those of the pinion gear 26 and so the intermediate state has not been reached. In this example, the state shown in FIG. 3 is assumed to occur between the non-locking and intermediate states, although it could also occur if the experienced deceleration was insufficient to cause the locking member 34 to reach its intermediate state (in which case the locking member 34 would move away from the pinion gear 26 when the deceleration decreased). Upon initial engagement of the gears 26, 34, the tips of their respective teeth may be aligned such that they clash with one another to prevent intermeshing of the gears 26, 34. If the crash load does not rise to a point where the resistance of the actuator is overcome, the system is still safe. However, if the level of deceleration continues to increase to the point where the rotary actuator resistance is overcome by the forces acting on the carriage 14, the carriage 14 will move causing the pinion gear 26 to rotate and allow the teeth of the gears 26, 34 to intermesh, causing the intermediate state to be adopted (FIG. 4).

In FIG. 4, the teeth of the locking member 34 have entered the spaces between the teeth of the pinion gear 26 and hence, the intermediate state has been reached and the further rotation of the pinion gear 26 cannot take place without rotation of the locking member 34. The counter rotational effect of the resilient biasing device on the locking member 34 and/or the presence of a back stop (not shown) may resist or even prevent further rotation of the locking gear 34 due to the rotation of the pinion gear 26. The back stop may be the same back stop as is comprised in the resilient biasing device, or it may be a different back stop. Following intermeshing with the pinion gear 26, the locking member 34 may be further rotated, overcoming the biasing effect of the resilient biasing device, until the teeth of the locking member 34 also intermesh with the teeth of the first gear 32 wherein the locking member 34 adopts its locking position (FIG. 5). Since the gears 26 and 32 rotate in opposite senses, simultaneous intermeshing of the locking member 34 with both of gears 26 and 32 will prevent further rotation of all three gears. The intermeshing of the pinion gear 26 and the locking member 34, and optionally the first gear 32, may occur when the force exerted on the locking apparatus 12 in the forward direction exceeds a threshold value. In the described examples, it is assumed that this occurs when the vehicle decelerates at a level above a threshold value.

Depending on the load exerted by the rotary actuator, the interaction between the intermeshed gears 26, 32, 34, may maintain them in their intermeshed state, i.e. maintain the locking state. Further, the interaction of the intermeshed gears 26, 32 and 34 tends to maintain the locked state due to the directions of rotation/moment about each gear axis, which tends to increase the meshing force on the gears 26, 33 and 34. If the direction of movement of the carriage 14 or the motor rotation were reversed, the gears would tend to disengage.

In alternative embodiments (not illustrated), any suitable actuator, e.g. a linear actuator, may be used to recline the seat 10 rather than a rotary actuator, in which case none of the gears of the locking apparatus 12, or coupled to the gears of the locking apparatus 12, are driven directly or in directly by a rotary drive device. For example, the carriage 14 may be driven by a linear actuator, in which case rotational movement would be imparted to the gears via the rack. Alternatively still, the seat recline mechanism may be manually driven, e.g. by a passenger, rather than by a powered actuator.

In alternative embodiments (not illustrated), the locking apparatus 12 may be provided on the moveable carriage 14 rather than the base 16, in which case the position of the rotational axis of the first gear 32, and the pinion gear 26 (if present), would be fixed with respect to the carriage 14. In such embodiments the rack 24 is typically provided on the base 16.

In alternative embodiments, the pinion gear 26 may be omitted and the gears 32, 34 may each interact directly with the rack 24. The operation of the locking apparatus 12 in such embodiments is substantially the same as that described above, although, in the locked state, the locking member 34 engages with the rack 24 and the first (optionally driven) gear 32 to lock the carriage 14 in position.

More generally, locking apparatus embodying the invention may comprise a first and a second component, each having a respective set of inter-engageable teeth, one component being provided on the carriage, the other on the base, such that the respective sets of teeth inter-engage, and such that, during movement of the carriage with respect to the base, one of said first and second components imparts movement to the other via the respective teeth, and wherein a locking member is movable between a non-locking state, in which said locking member is disengaged from the pinion gear and the first gear, and a locking state, in which said locking member inter-engages with the pinion gear, and optionally, the first gear, to prevent rotation of the pinion and first gears. The component with which the locking member may engage during use is typically also a rotatable gear, while the other component may be a rotatable gear, a toothed rack or other toothed component.

Alternative embodiments of the locking apparatus 12 may use more complex gear trains than those described herein, e.g. more than one driven gear and/or more than one locking member, or a gear train in place of any one or more of the aforementioned single gears.

The invention is not limited to the embodiment described herein but can be amended or modified without departing from the scope of the present invention.

What is claimed:

1. A vehicle seat having a carriage that is linearly movable with respect to a base, and a locking apparatus comprising first and second components, each having a respective set of teeth that inter-engage such that, during movement of the carriage with respect to the base, one of said first and second toothed components imparts movement to the other via the respective teeth, the locking apparatus further comprising a locking member having a set of teeth formed thereon for selectively inter-engaging the teeth of the first and second components, the locking member being movable between a non-locking state, wherein the teeth of the locking member do not engage the teeth of either of said first and second components, an intermediate state, wherein the teeth of the locking member engage the teeth of the first component, and a locking state, wherein the teeth of the locking member engage with the teeth of both of said first and second components to prevent relative movement between the first and second components, the locking member being moved between its intermediate and locking states by virtue of movement of the first component with respect to the second component, said carriage being linearly movable with respect to said base along a first axis corresponding to a fore-and-aft direction of a seated passenger, said locking member being responsive to a force in a first direction along said first axis above a threshold level to move from its non-locking state into its intermediate state, subsequent displacement of said carriage with respect to the base due to said force causing movement of the locking member from its intermediate state to its locking state, and said force being created in use by deceleration of said vehicle seat.

2. A vehicle seat having a carriage that is linearly movable with respect to a base, and a locking apparatus comprising first and second components, each having a respective set of teeth that inter-engage such that, during movement of the carriage with respect to the base, one of said first and second toothed components imparts movement to the other via the respective teeth, the locking apparatus further comprising a locking member having a set of teeth formed thereon for selectively inter-engaging the teeth of the first and second components, the locking member being movable between a non-locking state, wherein the teeth of the locking member do not engage the teeth of either of said first and second components, an intermediate state, wherein the teeth of the locking member engage the teeth of the first component, and a locking state, wherein the teeth of the locking member engage with the teeth of both of said first and second components to prevent relative movement between the first and second components, the locking member being moved between its intermediate and locking states by virtue of movement of the first component with respect to the second component, said carriage being linearly movable with respect to said base along a first axis corresponding to a fore-and-aft direction of a seated passenger, said locking member being responsive to a force in a first direction along said first axis above a threshold level to move from its non-locking state into its intermediate state, subsequent displacement of said carriage with respect to the base due to said force causing movement of the locking member from its intermediate state to its locking state, and said force being created in use by acceleration of said vehicle seat.

3. A vehicle seat as claimed in claim 1, wherein said locking apparatus is configured such that said locking member adopts its non-locking state under the influence of gravity.

4. A vehicle seat as claimed in claim 3, wherein said locking member is pivotably movable between its non-locking and intermediate states.

5. A vehicle seat as claimed in claim 1, wherein said locking member comprises is a partially toothed gear or a segment of a gear.

6. A vehicle seat as claimed in claim 1, wherein the first component comprising a rotatable gear and the second component comprises a rotatable gear, a toothed rack or other toothed component.

7. A vehicle seat as claimed in claim 1, wherein said carriage and said base are coupled together by a rack and pinion gear.

8. A vehicle seat as claimed in claim 7, wherein said first toothed component comprises said rack and said second toothed component comprises said pinion gear.

9. A vehicle seat as claimed in claim 7, wherein said first toothed component comprises said pinion gear, and said second toothed component comprises a toothed first gear intermeshed with said pinion gear.

10. A vehicle seat as claimed in claim 7, wherein the rack is provided on said carriage and the pinion gear is provided on said base, the pinion gear being rotatable about an axis that is fixed with respect to the base.

11. A vehicle seat as claimed in claim 7, wherein the rack is provided on said base and the corresponding pinion gear is provided on said carriage, the pinion gear being rotatable about an axis that is fixed with respect to the carriage.

12. A vehicle seat as claimed in claim 7, wherein the locking apparatus comprises a first gear coupled to the pinion gear such that the first gear and pinion gear rotate, in use, in opposite senses, and wherein the locking member is disengaged from the first gear and the pinion gear when in its non-locking state, the locking member being engaged with the pinion gear but disengaged from the first gear when in its intermediate state, and wherein the locking member intermeshes with both the pinion gear and the first gear, to prevent rotation of the pinion gear, when in its locking state.

13. A vehicle seat as claimed in claim 9, wherein the rack is provided on the carriage, said first gear being rotatable about an axis that is fixed with respect to the base, or the rack is provided on the base, said first gear being rotatable about an axis that is fixed with respect to the carriage.

14. A vehicle seat as claimed in claim 9, wherein said first gear intermeshes with said pinion gear.

15. A vehicle seat as claimed in claim 9, further comprising a supporting arm, the locking member being rotatably coupled to the supporting arm, and the supporting arm being pivotable with respect to the locking apparatus to allow the locking member to pivot between its non-locking state and its intermediate state and to rotate between its intermediate and locking states.

16. A vehicle seat as claimed in claim 15, wherein the supporting arm is pivotable about the rotational axis of the first gear.

17. A vehicle seat as claimed in claim 15, wherein the locking member and the pivot axis of the locking member are positioned below the pinion gear, the locking member being arranged to adopt its non-locking state under the influence of gravity.

18. A vehicle seat as claimed in claim 15, wherein the supporting arm has a counterweight portion, and the supporting arm is configured to have a centre of gravity positioned such that the mass of the counterweight portion tends to cause a moment under gravity about the pivot axis of the supporting arm that has an opposite sense to the moment caused by the mass of the locking member under gravity.

19. A vehicle seat as claimed in claim 7, wherein said carriage is linearly movable with respect to said base along a first axis corresponding to a fore-and-aft direction of a seated passenger, the first gear being located below and aft of the pinion gear, the locking member preferably being located below and forwardly of the first gear.

20. A vehicle seat as claimed in claim 9, wherein either the first gear or the pinion gear is directly or indirectly coupled to an output shaft of a rotary actuator.

21. A vehicle seat having a carriage that is linearly movable with respect to a base, and a locking apparatus comprising first and second components, each having a respective set of teeth that inter-engage such that, during movement of the carriage with respect to the base, one of said first and second toothed components imparts movement to the other via the respective teeth, the locking apparatus further comprising a locking member having a set of teeth formed thereon for selectively inter-engaging the teeth of the first and second components, the locking member being movable between a non-locking state, wherein the teeth of the locking member do not engage the teeth of either of said first and second components, an intermediate state, wherein the teeth of the locking member engage the teeth of the first component, and a locking state, wherein the teeth of the locking member engage with the teeth of both of said first and second components to prevent relative movement between the first and second components, the locking member being moved between its intermediate and locking states by virtue of movement of the first component with respect to the second component, wherein a resilient biasing device is arranged to maintain the locking member in an orientation in which the teeth of said locking member are engageable with the teeth of the pinion gear when the locking member is moved to its intermediate state or wherein a resilient biasing device is arranged to maintain the locking member in an orientation in which the teeth of said locking member are not engageable with the teeth of the first gear when the locking member is in the non-locking state.

22. A vehicle seat as claimed in claim 21, wherein the resilient biasing device comprises a spring loaded detent and a back stop to restrict the rotation of the locking member caused by the rotational force imparted on the locking member by the spring loaded detent.

23. A vehicle seat as claimed in claim 21, wherein the biasing force of said resilient biasing device can be overcome in the event of said threshold force and/or said rotational force exerted on the locking member by the pinion gear.

24. A vehicle seat as claimed in claim 1, wherein the seat is reclinable, said relative linear movement of the carriage and base corresponding to the seat being operated between reclined and non-reclined states.

25. A vehicle seat as claimed in claim 1 wherein the seat is movable forward and rearwards, said relative linear movement of the carriage and base corresponding to the seat being moved forward and rearward.

* * * * *